United States Patent [19]

Gutleber

[11] 4,275,397

[45] Jun. 23, 1981

[54] INTERFERENCE CANCELING RANDOM ACCESS DISCRETE ADDRESS MULTIPLE ACCESS SYSTEM

[75] Inventor: Frank S. Gutleber, Little Silver, N.J.

[73] Assignee: The United Statesof America as represented by the Secretary of the Army, Washington, D.C.

[21] Appl. No.: 64,160

[22] Filed: Aug. 6, 1979

[51] Int. Cl.$^3$ .............................................. H04B 7/00
[52] U.S. Cl. .............................. 343/100 CS; 455/283
[58] Field of Search ................. 343/100 CL, 100 LE, 343/100 CS; 455/277, 278, 283, 296, 304

[56] References Cited

U.S. PATENT DOCUMENTS 3,202,990  8/1965  Howells ........................ 343/100 CL

*Primary Examiner*—Theodore M. Blum
*Attorney, Agent, or Firm*—Nathan Edelberg; Jeremiah G. Murray; Edward Goldberg

[57] ABSTRACT

The described system utilizes the interference cancelation technique disclosed in my pending U.S. Pat. application Ser. No. 114,547, filed Jan. 23, 1980, with narrow-band orthogonal addressing in providing improved system performance, but only with modest equipment requirements. Orthogonal narrow-band frequency division multiple access signaling is employed to initially accomplish call-up, with interference then being adaptively suppressed and an available voice channel selected for accomplishing the communication requirements.

5 Claims, 3 Drawing Figures

INTERFERENCE CANCELING RANDOM ACCESS DISCRETE ADDRESS MULTIPLE ACCESS SYSTEM

FIELD OF THE INVENTION

This invention relates to communications systems, and more particularly, to tactical communications systems such as Random Access Discrete Address (RADA) and mobile subscriber access sub-systems.

BACKGROUND OF THE INVENTION

As is well known and understood, one of the major concerns of direct call-up multiple-access systems in their relative complexities and attendant costs. The non-orthogonal addressing concepts of frequency time coding, frequency hopping, time hopping, pseudo-noise coding (and their hydbrids) generally found in multiple access approaches have proven to be quite complex in establishing the needed equipment requirements. As is also well known, self interference was found to be such that as soon as 20–30 users came on simultaneously, system performance would degrade to the point where the operation was deleteriously affected. Additionally, intentional interference, e.g., signal jamming, was found to be fairly pronounced—which, in a tactical combat environment, could not be tolerated comfortably to any great extent. In the more recent sophisticated systems attempting to deal with these operational requirements, the associated cost, size and weight restrictions made the necessity for a new approach that much more apparent.

SUMMARY OF THE INVENTION

As will become clear hereinafter, the direct call-up multiple access system of the present invention utilizes the interference canceling technique described in my pending U.S. patent application Ser. No. 114,547, filed Jan. 23, 1980. As is therein described, such interference canceler affords an operation which simulates that of a directional antenna in eliminating, or reducing, external interference sources, but with simple and inexpensive circuitry. As will be seen below, the first embodiment of the canceler there shown is utilized in this arrangement, with orthogonal multiplexing being employed in conjunction with a notched antenna to cancel interference arriving from all directions, except over the narrow beam width portion formed with the notched antenna. By utilizing this system, a form of space division multiple accessing is provided to alleviate the saturation condition that might occur in a confined area where the message traffic is heavy. By employing narrow band frequency division multiple access addressing, furthermore, self-interference becomes virtually non-existent. The system invention described will be seen to also use demand assignments for the wide band message channels so as to enable simultaneous support of a large quantity of users, all without meaningful self-interference problems. Not only will it be observed that the interference cancelation is utilized to prevent spectrum congestion when communicating in the wideband message traffic mode, but the use of the interference canceling scheme will be noted to automatically provide a large amount of anti-jamming protection, and at no additional expense.

BRIEF DESCRIPTION OF THE DRAWING

These and other features of the present invention will be more readily understood from a consideration of the following description taken in connection with the accompanying drawing in which.

DETAILED DESCRIPTION OF THE DRAWING

Figure 1:
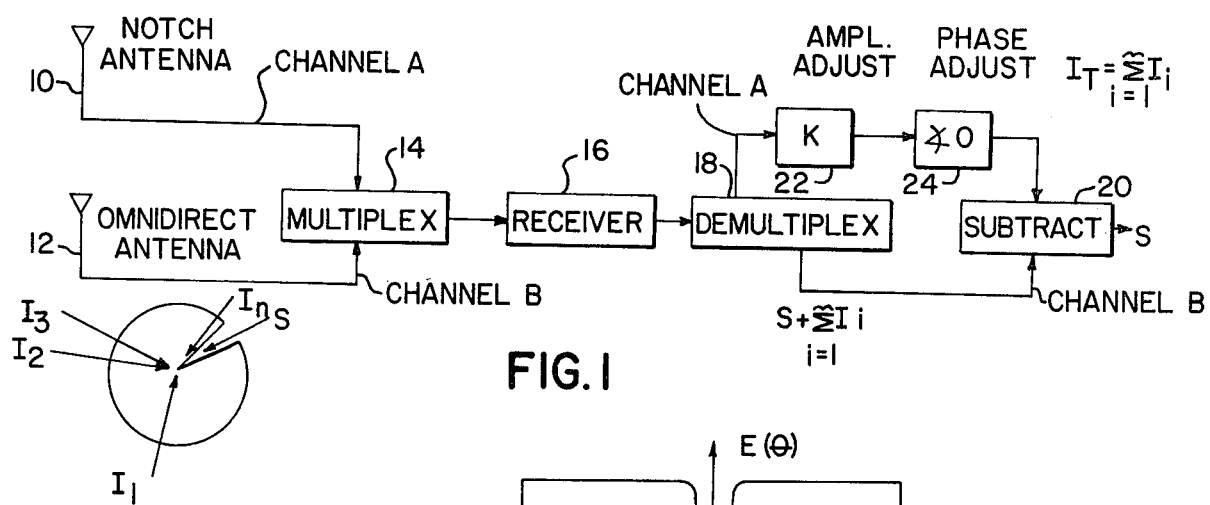
FIG. 1 is a functional block diagram of a multiplexed interference canceling receiver system of the type constructed in accordance with the teachings of my aforementioned pending patent application.

The interference canceling arrangement shown in FIG. 1, eliminates, or reduces, interference in a transmission link by utilizing orthogonal multiplexing in conjunction with the notched antenna (i.e., an antenna which has a single deep null over a small angular beam width). The inset alongside FIG. 1 represents the beam pattern of an almost omnidirectional antenna 10 having a narrow notch or nulled-out beam width, in which "S" represents the desired signal received and "$I_1$", $I_2$", "$I_3$", ... "$I_n$" represents external interference signals. The output of the notched antenna 10 (channel A) is orthogonally multiplexed with the output of an omnidirectional antenna 12 (channel B), with the multiplexing being of time, frequency or space method so long as the signals from the antennas 10, 12 are rendered non-interfering with each other. The output from the multiplexer 14 is then amplified in a receiver 16, and separated in a de-multiplexer 18. A subtractor 20 is employed, to one input of which is provided the output of de-multiplexer 18 which corresponds to the channel B signal, as comprising the desired information, plus all of the interfering signals from the external sources. On the other hand, by rotating the notched antenna 10 (or electronically scanning it) until its notch is pointing in the direction of the desired signal (as shown in the inset), then the output from the de-multiplexer 18 which corresponds to the channel A signal would contain all of the interfering signals, but not the desired signal. This second output provides a coherent and correlated replica of all the interference associated with the signal entering the omnidirectional antenna 12, and is provided as the other input to the subtractor 20. By including amplitude and phase adjusting circuits 22, 24 in this second branch, to account for an inherent differences in gain and delay in the two orthogonal channels, the de-multiplexed output from the notched antenna 10 can be directly subtracted from the de-multiplexed output from the omnidirectional antenna 12 to yield a totally interference free signal.

As set forth in my application Ser. No. 114,547, one major advantage of this configuration is that all interference entering the antenna 10 which is outside of the notched beam is virtually eliminated without requiring any complex adaptive processing, or requiring a large complex narrow beam antenna. This makes the FIG. 1 system arrangement desirable, as herein, for mobile communications usage, and for small, lightweight, tactical communications equipment.

Figure 2:
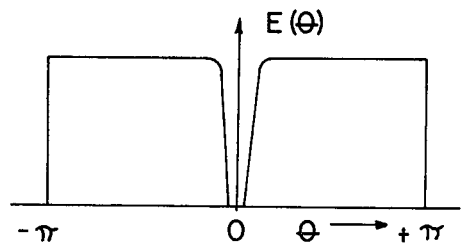
FIG. 2 is a simplified illustration of an antenna pattern helpful in an understanding of the block diagram of FIG. 1.

As will be readily apparent to those skilled in the art, the notched antenna 10 of FIG. 1 represents one of the major elements in the multiple accessing system of the invention, and introduces different requirements for operation than are normally encountered in typical antenna design. For example, instead of being concerned with a design which forms a directive beam having low sidelobes, or designing an adaptive system having several movable nulls, the antenna engineer is here concerned with providing a fixed pattern which contains uniform reception in all directions, except for that in which the normal beam slot points. Additionally, and as described in my pending application, to be effective, the antenna design needs a slope in the pattern developed, at the point of the null, and to be as steep a slope as is practical. Such a required pattern is illustratively shown in FIG. 2. Also described in my Ser. No. 114,547 application is the general design procedure for providing an array antenna having the type of pattern shown in FIG. 2.

Figure 3:
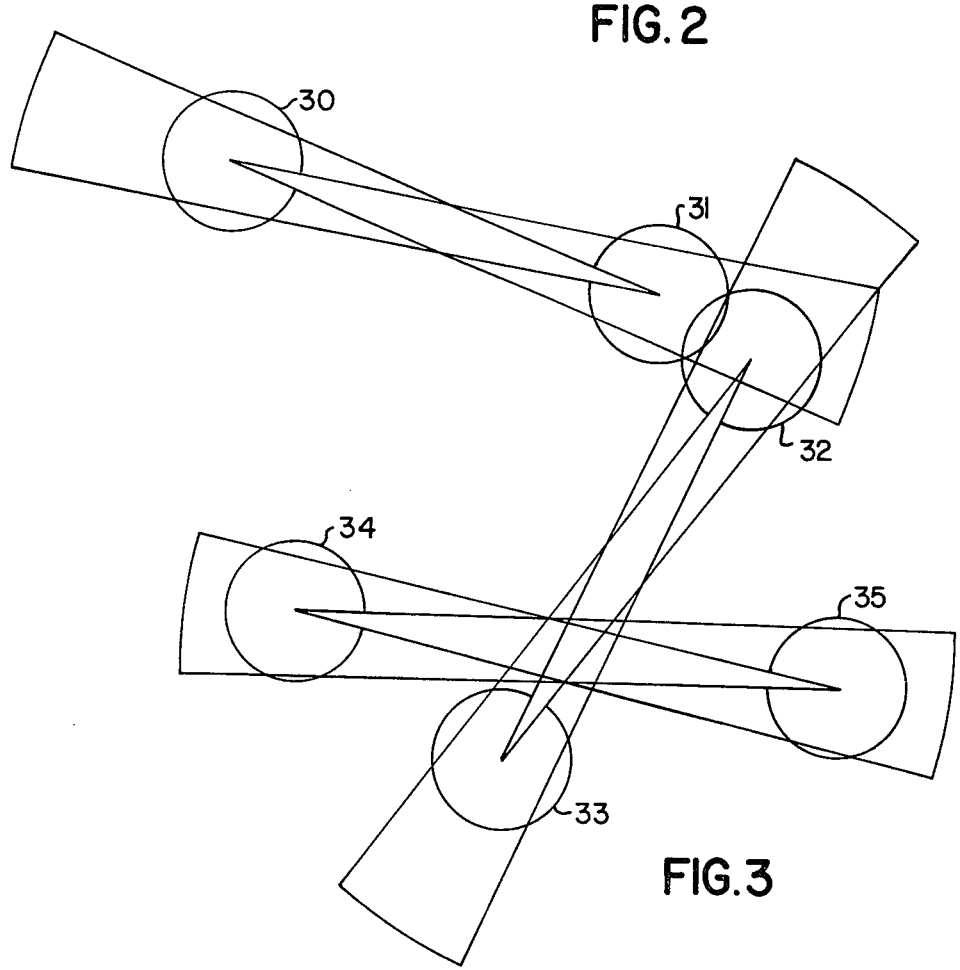
FIG. 3 illustrates conceptually the interference canceling multiple access system of the invention.

The arrangement of FIG. 3 shows the location of six participants in a multiple access communication system, 30-35. In such a system configuration, each of the participants typically employ an omnidirectional antenna both for transmitting and receiving. In order to reduce interference between these users, complex frequency coding, time coding and psuedo-noise coding constraints have been employed in the past. It will be apparent that as the numbers of participants increase, the interference problem increases as well, and the inherent complexity of the system results in significantly increased costs to maintain an acceptable degree of operation. The use of narrow, pencil beamwidth antennas, while useful in reducing any interference present in the message traffic, suffers the disadvantage of being not only costly, but of substantial size and weight—undesirable in a tactical environment situation.

The arrangement of FIG. 3, on the other hand, further illustrates the results of using the interference canceling system of FIG. 1 in this mobile access environment. With the interference canceler, it will be understood that the notched beamwidth associated with participant 30 will result in received communications from the transmitters of participants 31 and 32 only,—i.e. the transmissions from participants 33, 34, and 35 will be outside the notch, and thus would not be received. Also indicated in the illustration of FIG. 3 is that participant 33 will be in reception of transmissions only from participant 32. Because the notched beamwidths of participants 34 and 35 only encompass one another, they will be completely free of interference from all the other users.

By virtue of using the interference canceler in the random access discrete address system or in the mobile subscriber system, it will be noted that users 30-31 could thus communicate on the same frequency as communications between the users 34-35. Were it not for the fact that the transmitter of user 32 was in the notched beamwidth of user 30, then it would be possible for the users 32, 33 to also communicate on the same frequency as users 30, 31. In other words, the same frequency could be employed for the message traffic between all users whose notched beamwidths of the interference canceling arrangement do not receive transmissions from more than one source. Advantages of this arrangement include alleviating a possible saturation condition which could occur in a confined area—in essence, establishing a form of space division multiple accessing. Because all the interference entering the notched antenna located outside of the notch is subtracted out, the message channels become much less vulnerable to intentional interference or jamming—while at the same time, establishing the ability to simultaneously use the same frequency bands for separate users, even though they may be closely spaced together. The interference canceler usage thus provides the needed anti-jamming capability associated with mobile access tactical communication systems.

In accordance with the present invention, to correct for the interference situation which exists between participant 30 and user 32, as illustrated, different carrier frequency bands are selected for the message traffic along these communication links. Once call-up is established between users 30 and 31, the interference created by the source 32 can be adaptively suppressed and an available voice channel selected for accomplishing the communication requirement. Thus, if the initial call-up is established between users 30, 31 over a frequency band $F_1$, a frequency $F_1'$ can be assigned between the users for the message traffic. In similar manner, the initial call-up between users 32, 33 can be established in a second frequency band $F_2$, with the message traffic then being assigned in a different message band $F_2'$. Whereas the call-up between users 34, 35 would be established along a frequency band $F_3$, the message information can be transmitted in the band $F_1'$ or $F_2'$ as the interference canceling arrangement eliminates substantially all the signal interference outside the notch of the antenna beamwidth. The use of demand assignment for the message channels gives a frequency division multiple access arrangement to enable the simultaneous support of a large quantity of users, with substantially no self-interference problems. With the mobile communication system implemented to use different frequencies only in interfering situations, the spectrum utilization proves extremely attractive, with the complete avoidance of self-interference in an operational system.

In accordance with another, extremely important aspect of the present invention, narrowband orthogonal addressing is employed to provide the initial call-up, with only the wideband mode being used for the demand-assigned message traffic. This follows from a realization that the signalling needed to establish the connection can be at a very slow rate, rather than at the high rate needed to transmit the message information without unnecessary constraints. With an ultra-narrow band, such as between 10-15 Hz, the bandwidth required to support 50,000 users could be as low as 0.5 Mhz, which is readily available. Also, as a direct advantage, is that frequency synthesizers and oscillator stabilities are within the state of the art to retain each user in its own identifying slot so as to avoid drifting, and be able to correct and/or account for Doppler shifts.

Another very important advantage of employing the narrowband frequency division multiple access addressing is its substantial immunity to intentional interference or jamming. As will be seen, the numerous quantity of unique addresses (e.g. 50,000) forces a potential jammer to spread his energy in an attempt to jam the system. If a narrowband or spot jammer were employed, then it will be seen that only a fraction of the users could be jammed.

In operating in the proposed system, the notched antenna would be sequentially scanned by each user in a call until the notch of each user's antenna is pointing toward the other user. This would be accomplished while operating in the narrowband signalling mode. After the notched antennas are aligned, the available wideband voice frequency band would be identified, and one free channel mutually selected by the two users who are involved. Communications can then proceed over wideband voice, data, teletype, or facsimile channels.

By eliminating in the above manner, all of the interference entering the system in the message traffic (wideband) mode for most of the space direction, the equivalent of operating with a very narrowbeam antenna is realized. However, the important difference is that an antenna designed to produce a notch (i.e., null out some small angular beamwidth) is much less complex, costly and smaller in size and weight than the narrow pencil beamwidth antenna. The design considerations, however, are somewhat different than normally encountered in an antenna design, as is more clearly described in my aforenoted pending application. It will also be appreciated that the different embodiments described in that application for the notched antenna embodiments could be substituted, as well, for that described in FIG. 1 herein. With the present invention, furthermore, operating with wide pulse widths for the signalling traffic (narrowband frequency division multiple accessing) and with relatively wide pulse widths for the message traffic, serve to reduce multipath problems at the same time.

While there has been described what is considered to be a preferred embodiment of the present invention, it will be readily apparent that modifications may be made by those skilled in the art without departing from the scope of the teachings herein of utilizing orthogonal narrowband frequency division multiple access signalling to initially accomplish call-up, of adaptively suppressing interference with an interference canceler and switching to a selected available voice channel for accomplishing the communication requirements and of using the interference canceler to add additional voice frequency band availability. For at least such reason, therefore, resort should be had to the claims appended hereto for a true understanding of the scope of the invention.

I claim:

1. In a multiple access communications system, the combination comprising: a first transmitter and receiver station for transmitting and receiving desired signals and receiving undesired interference signals including, first antenna means having an omnidirectional beam pattern for receiving said desired signals accompanied by said undesired interference signals; second antenna means having a generally omnidirectional antenna beam pattern with a single notched portion, said second antenna means receiving substantially only said undesired interference signals; third means coupled to said first and second means for combining said received desired and undesired signals therefrom to produce substantially only said desired signals as an output of said system; and a second transmitter and receiver station including further first, second and third means, said second antenna means of said first and second stations being positioned with the respective notched portions directed at the source of desired signals to permit said third means to cancel said undesired interference signals.

2. The combination of claim 1 wherein said second antenna means notched portion has a steep slope beam pattern null pointing in the direction of said source of said desired signals.

3. The combination of claim 1 wherein the omnidirectional antenna of said first means operates at a frequency corresponding to that of the desired signal source.

4. The combination of claim 1 wherein said third means includes means for orthogonally multiplexing said signals from said first and second means, means for demultiplexing the multiplexed signals from said first and second means, and means for subtracting said undesired signals from the combined desired and undesired signals.

5. The combination of claim 4 wherein said third means includes means for adjusting the phase and amplitude of signal differences between said first and second means.

* * * * *